Figure 1:
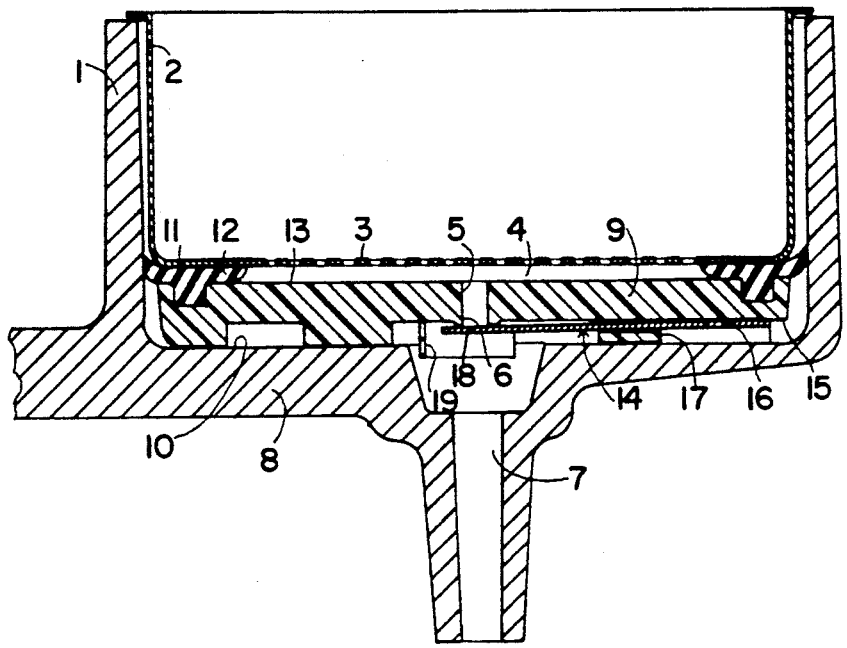

United States Patent [19]

Schiettecatte

[11] Patent Number: 5,150,645
[45] Date of Patent: Sep. 29, 1992

[54] FILTER HOLDER FOR A COFFEE MACHINE OF THE "ESPRESSO" TYPE

[75] Inventor: Patrice J. C. Schiettecatte, Alencon, France

[73] Assignee: Moulinex (Societe Anonyme), Bagnolet, France

[21] Appl. No.: 707,004

[22] Filed: May 29, 1991

[30] Foreign Application Priority Data

May 30, 1990 [FR] France .................. 90 06734

[51] Int. Cl.⁵ .................................... A23F 5/24
[52] U.S. Cl. ......................... 99/295; 99/299
[58] Field of Search .............. 99/279, 280, 299, 300, 99/302 R, 295; 426/433

[56] References Cited

U.S. PATENT DOCUMENTS

| | | | |
|---|---|---|---|
| 3,972,273 | 8/1976 | Carlson et al. | 99/300 |
| 4,083,295 | 4/1978 | Hollingsworth | 99/302 R |
| 4,132,239 | 1/1979 | Bowen et al. | 99/305 |
| 4,189,991 | 2/1980 | Haddad | 99/302 R |
| 4,343,232 | 8/1982 | Corbier | 99/299 |
| 4,429,623 | 2/1984 | Illy | 99/295 |
| 4,506,597 | 3/1985 | Karns et al. | 99/295 |
| 4,599,937 | 7/1986 | Ghione | 99/302 R |
| 4,966,070 | 10/1990 | Frisch | 99/295 |
| 4,999,470 | 3/1991 | Fuchs | 99/306 |

FOREIGN PATENT DOCUMENTS

| | | | |
|---|---|---|---|
| 0287780 | 10/1988 | European Pat. Off. | 99/288 |
| 2212283 | 9/1973 | Fed. Rep. of Germany | 99/279 |
| 0524448 | 4/1955 | Italy | 99/302 R |

*Primary Examiner*—Philip R. Coe
*Assistant Examiner*—James F. Hook
*Attorney, Agent, or Firm*—Young & Thompson

[57] ABSTRACT

A filter holder designed for use with a coffee machine of the "espresso" type comprises a receptacle for receiving a perforated filter cup. The filter cup and the receptacle together define an infusion collecting chamber underlying the filter cup. The infusion collecting chamber communicates via an outlet with a distributing funnel extending downwardly from the receptacle. At the opening of the outlet channel there is disposed the free end of a flexible blade extending transversely of the channel. The free end of the flexible blade is applied with a predetermined force against the opening of the channel such that the infusion discharged from the outlet channel emanates in a laminar flow and is atomized upon contact with a partition surrounding the free end of the blade, to produce a substantial quantity of foam.

4 Claims, 1 Drawing Sheet

FILTER HOLDER FOR A COFFEE MACHINE OF THE "ESPRESSO" TYPE

The invention relates to a filter holder adapted to be mounted on a coffee machine of the "espresso" type and comprising a receptacle for receiving a filter in the form of a cup that is intended to contain an amount of ground coffee and whose bottom is perforated, and an infusion collecting chamber situated beneath the said filter and comprising an outlet channel for the infusion whose opening communicates with a distributing funnel that permits the infusion to flow out from the said receptacle.

In "espresso" machines now in existence, hot water is conducted onto the ground coffee contained in the filter at a pressure from 10 to 15 bar. In passing through the coffee, the water pressure decreases to atmospheric upon its arrival at the outlet of the filter. The foam which thus appears on the coffee is due principally to the generation, in the infusion exiting the filter, of air bubbles which were compressed in the water circuit of the machine and in the ground coffee. Consequently, this foam is produced in only a slight quantity.

The invention especially has as an object to improve the production of foam.

According to a primary characteristic, the filter holder is equipped with a device for making foam, comprising a flexible blade disposed transversely at the opening of the channel, one end of which is anchored on a base integrated with the bottom wall of the chamber, and the other end of which is free. The blade is applied with a predetermined force against the opening so as to produce a laminar jet of the infusion only when the pressure in the chamber is greater than the force with which the free end of the blade is applied against the opening. The filter holder also comprises a partition arranged around the blade and extending downwardly such that the jet of infusion becomes atomized on the partition to form the foam.

Thanks to this device for making foam, there is produced by a venturi effect, at the level of the blade and by fractionation against the wall, an air-infusion mixture sufficiently great to create a thick foam in the dispensed coffee.

The invention also has as an object to produce an enriched foam using a foodstuff such as chocolate.

According to another embodiment of the invention, the bottom of the receptacle is formed with a hole to constitute the outlet channel for the infusion and the flexible blade is secured directly to the external surface of the bottom of the receptacle, whereas the partition is constituted by the internal peripheral surface of the funnel thus providing a housing for a foodstuff, the said funnel being to this end removably mounted on the external surface of the bottom of the receptacle by means of a removable fixation device.

Thanks to this embodiment, the infusion jet also strikes the piece of chocolate or chocolate powder contained in the housing. Thus, the chocolate progressively melts and creates a much more plentiful foam, rendering the coffee foamier and with a very agreeable taste.

Figure 2:
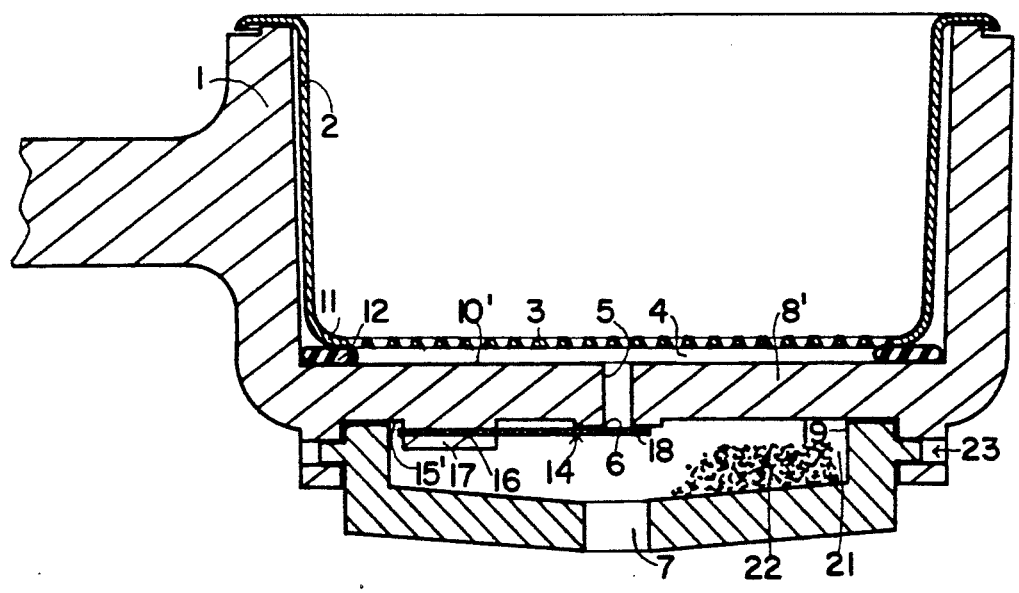

The characteristics and advantages of the invention will be seen more clearly from the following description, given by way of example and with reference to the accompanying drawings, in which:

FIG. 1 is a vertical section of a filter holder according to a first embodiment of the invention; and FIG. 2 is a vertical section of a filter holder according to a second embodiment of the invention.

The filter holder shown in FIGS. 1 and 2 is intended to be mounted on a coffee machine of the "espresso" type and comprises, in a manner known in itself, a receptacle 1 for receiving a filter 2 in the form of a cup which is intended to contain an amount of ground coffee and whose bottom 3 is perforated, and an infusion collecting chamber 4 situated beneath the bottom 3 and comprising an outlet channel 5 for the infusion, the opening 6 of which communicates with a distributing funnel 7 extending downwardly from the bottom 8, 8' of the receptacle and permitting the collected infusion to flow out from the receptacle into a coffee cup generally placed below.

According to a first embodiment (FIG. 1), the filter holder has in the bottom 8 of the receptacle a central conduit forming a distributing funnel 7 and is equipped with a plate 9 formed from plastic material which has a hole formed at its center to form the outlet channel 5 and which is arranged between the bottom 3 of the filter 2 and the internal surface 10 of the base 8 of the receptacle 1, the said plate 9 constituting the bottom wall of the infusion collecting chamber 4.

The perforated bottom 3 of the filter 2 rests via its periphery 11 on an annular sealing element 12, such as a silicone gasket, which is disposed on the upper surface 13 of the plate 9 and whose thickness thus defines the height of the said chamber.

The filter holder is equipped with a device for making foam comprising a flexible blade 14 disposed beneath the bottom wall transversely of the opening 6 of the channel 5, one end 16 of which is secured to a base 17 integrated with the lower surface 15 of the bottom wall of the chamber 4 and the other end 18 of which, being free, is applied with a predetermined force against the opening 6, as well as a partition 19 arranged around the blade 14 and extending downwardly.

Thus, when the pressure of the liquid in the chamber 4 exceeds the force with which the free end 18 is applied against the opening 6, there is produced at that time a laminar jet of infusion which becomes atomized on the partition 19, preferably situated close to the blade, thus forming the foam which then flows into the funnel 7. It will be appreciated that this foam is more or less substantial as a function of not only the distance at which the partition 19 is implanted with respect to the opening 6, but also the application force which permits the laminar jet to entrain more or less air captured laterally by a venturi effect, at least in the longitudinal direction of the blade 14.

FIG. 2 illustrates a second embodiment of the invention in which, for ease of understanding, the elements similar to those of FIG. 1 are given the same reference numerals. As shown, the receptacle 1 contains a filter 2 which rests on an annular gasket 12 disposed directly on the internal surface 10' of the bottom 8' of the receptacle 1. The bottom 8' of the receptacle 1 constitutes the bottom wall of the chamber 4 and is formed with a hole so as to constitute the outlet channel 5 for the infusion, and the flexible blade 14 is anchored on a base 17 integrated with the lower surface 15' of the said bottom 8', whereas the partition 19 is constituted by the internal peripheral surface of the funnel 7 thus providing a housing 21 for a foodstuff 22 such as powdered chocolate or pieces of chocolate, the said funnel being for this purpose removably mounted on the lower surface 15' of the bottom 8' by means of a removable fixation device of the bayonet type shown at 23.

It will be appreciated that the operator, after removing the funnel 7 from the receptacle 1, places for example a piece of chocolate 22 in the housing 21. Then, he secures the funnel 7 onto the receptacle 1 by means of the bayonet closure 23. As soon as the free end 18 of the blade 14 lets escape a laminar infusion jet from the opening 6, this latter strikes not only the wall 19 but also the pieces of chocolate, causing their progressive melting and an infusion-chocolate emulsion which permits producing a plentiful foam and a coffee having a very agreeable taste.

What is claimed is:

1. Filter holder adapted to be mounted on a coffee machine of the "espresso" type, said filter holder comprising a receptacle (1) adapted to receive a filter (2) in the form of a cup which is intended to contain an amount of ground coffee and whose bottom (3) is perforated, and an infusion collection chamber (4) situated beneath the bottom (3) of said filter and comprising a bottom wall (9, 8') which has an infusion outlet channel (5) therein, said channel (5) having an opening (6) communicating with a distributing funnel (7) permitting coffee to flow out from the receptacle, said filter holder further comprising a device for making foam comprising a flexible blade (14) disposed transversely across the opening (6) of the channel (5), one end (16) of which is anchored on a base (17) integrated with the bottom wall (9, 8') of the chamber (4), and the other end (18) of which is free and is applied with a predetermined spring force against said opening (6) so as to produce a laminar infusion jet only when the pressure in the chamber (4) is greater than the force with which the free end (18) of the blade is applied against the opening (6), and a partition (19) arranged around the blade (14) and extending downwardly such that the infusion jet becomes atomized on the partition thereby forming the foam.

2. Filter holder according to claim 1, wherein the perforated bottom (3) of the filter rests via its periphery on an annular sealing element (12) which is disposed on the upper surface (13, 10') of the bottom wall of the collection chamber (4) and whose thickness thus defines the height of said chamber.

3. Filter holder according to claim 2, wherein the bottom (8) of the receptacle (1) has a central conduit forming a distributing funnel (7), said filter holder further comprising a plate (9) which comprises a hole at its center to form the outlet channel (5) and which is arranged between the bottom (3) of the filter (2) and the internal surface (10) of the bottom (8) of the receptacle (1), said plate (9) bearing on its upper surface (13) the sealing element (12), and on its lower surface (15) the flexible blade (14) and the partition (19).

4. Filter holder according to claim 2, wherein the bottom (8') of the receptacle (1) forms the bottom wall of the collection chamber (4) and is formed with a hole so as to constitute the outlet channel (5) for the infusion, the flexible blade (14) is anchored on a base (17) integrated with the lower surface (15') of the bottom (8') of the receptacle, whereas the partition (19) is constituted by the internal peripheral surface of the funnel (7) thus providing a housing (21) for a foodstuff (22), the funnel (7) being for that purpose removably mounted on the lower surface of the bottom (8') of the receptacle by means of a removable fixation device (23).

* * * * *